United States Patent [19]

Dada et al.

[11] Patent Number: 5,328,972
[45] Date of Patent: Jul. 12, 1994

[54] PROCESS FOR PREPARING LOW MOLECULAR WEIGHT POLYMERS

[75] Inventors: Emmanuel A. Dada, Bensalem; Willie Lau, Ambler; Richard F. Merritt, Fort Washington, all of Pa.; Yi H. Paik, Princeton, N.J.; Graham Swift, Blue Bell, Pa.

[73] Assignee: Rohm and Haas Company, Philadelphia, Pa.

[21] Appl. No.: 952,386

[22] Filed: Sep. 28, 1992

[51] Int. Cl.$^5$ .................... C08F 4/34; C08F 4/28; C08F 20/06; C08F 22/06; C08F 22/02
[52] U.S. Cl. .................... 526/227; 526/230; 526/235; 526/271; 526/317.1; 526/318.2
[58] Field of Search .............. 526/89, 227, 271, 317.1, 526/318.2, 318.3, 230, 235

[56] References Cited

U.S. PATENT DOCUMENTS

| | | | |
|---|---|---|---|
| 3,522,228 | 7/1970 | Fukui et al. | 260/94.9 |
| 4,313,044 | 2/1982 | Huges et al. | 260/29.6 M |
| 4,748,220 | 5/1988 | Hartmann et al. | 526/89 |
| 5,212,229 | 5/1993 | Taylor et al. | 524/556 |

FOREIGN PATENT DOCUMENTS 1262995  11/1989  Canada.
1274942  10/1990  Canada.
301532  2/1989  European Pat. Off..

OTHER PUBLICATIONS

J. M. DeSimone, Zihibin Guan, C. S. Elsbernd, Science, 257(5072), 945–7, Aug. 14, 1992.
J. A. Hyatt, "Liquid and Supercritical Carbon Dioxide as Organic Solvents", J. Org. Chem., 1984, 49, 5097–5101, published in USA.
K. M. Scholsky, "Supercritical Polymerization Reactions", Polymer Reprints, 1990, 31(1), 685–686, published in USA.
T. Spychaj, et al., "High Temperature Continuous Bulk Copolymerization of Styrene and Acrylic Acid; Thermal Behavior of the Reactants", J. Appl. Polymer Science, 1991, vol. 42, 2111–2119, published in USA.

*Primary Examiner*—Joseph L. Schofer
*Assistant Examiner*—Wu C. Cheng
*Attorney, Agent, or Firm*—David T. Banchik

[57] ABSTRACT

A process for preparing polymers having molecular weights below 5,000 and polydispersity below 2.5 is provided. The polymerization is conducted in supercritical carbon dioxide at temperatures of at least 200° C. and pressures above 3,500 psi. The process can be continuous, semi-continuous, or batch. The polymers are useful as detergent additives, scale inhibitors, dispersants and crystal growth modifiers.

17 Claims, No Drawings

PROCESS FOR PREPARING LOW MOLECULAR WEIGHT POLYMERS

FIELD OF THE INVENTION

This invention relates to processes for the production of low molecular weight polymers. In particular, this invention relates to polymerization processes conducted in supercritical carbon dioxide at temperatures above 200° C. and above 3,500 pounds per square inch (psi) to produce polymers having weight average molecular weights ($M_w$) below about 5,000 and having a polydispersity (ratio of the weight average molecular weight to the number average molecular weight ($M_n$)) of below 2.5.

Low molecular weight polymers are known to be useful detergent additives, anti-redeposition agents, hard surface cleaners, scale inhibitors, pigment dispersants, water treatment additives and the like. However, production of very low molecular weight polymers of certain monomers, especially acrylic acid, has proven to be a difficult task.

In certain applications, such as detergent additives, it is becoming increasingly important that the polymers are biodegradable. It is known that biodegradability increases as molecular weight decreases. Therefore, processes which produce very low molecular weight polymers may provide routes to biodegradable polymer products.

In other applications, such as water treatment, it is particularly important that the polymer product have a narrow molecular weight distribution, i.e., low polydispersity. Polydispersity rises rapidly as the high molecular weight fraction of the polymer mixture increases. In many processes designed to produce low molecular weight polymers, high molecular weight fractions are observed because there is insufficient control over chain-chain coupling and branching. These high molecular weight fractions tend to dominate the viscosity characteristics of the polymer product and can detract from the polymer performance. Other processes designed to produce low molecular weight polymers result in the formation of excessive amounts of dimers and trimers which can also detract from the polymer performance. These by-products do not have as much of an effect on the viscosity characteristics of the polymer mixture; however, they do affect the number average molecular weight such that the number average molecular weight may give a false indication of the polymer properties.

In addition to chain-chain coupling and branching, processes for producing low molecular weight polymer products tend to have high polydispersities resulting from the methods used to reduce the residual monomer content of the polymer product. Standard methods of reducing the residual monomer content of the polymer mixture include post-polymerization with additional initiator, extended holds at elevated temperatures and use of comonomeric scavengers. All of these methods will broaden the molecular weight distribution. Unless the polymer mixture has a sufficiently low polydispersity to begin with, the methods used to reduce residual monomer content will raise polydispersity of the product to an unacceptable level.

The art has long sought an inexpensive, efficient and environmentally sound way to produce low molecular weight polymers having a low polydispersity.

One method of achieving low molecular weight polymers is through the use of efficient chain transfer agents, but this approach has several drawbacks. This approach incorporates the structure of the chain transfer agent into the polymer chain. This can be undesirable since that structure will have an increasing effect on the properties of the polymer as molecular weight decreases. Furthermore, the chain transfer agents commonly employed are mercaptans. These materials are expensive and have objectionable odors associated with their presence. Other common chain transfer agents are hypophosphites, bisulfites, metabisulfite and alcohols. These also add to the cost of the process, impart functionality to the polymer, can introduce salts into the product, and may necessitate a product separation step.

Another way of lowering the molecular weight of the polymers produced is by increasing the amount of initiator. This approach adds considerably to the cost of production and may result in polymer chain degradation, crosslinking, and high levels of unreacted initiator remaining in the product. In addition, high levels of initiator may also result in high levels of salt by-products in the polymer mixture which is known to be detrimental to performance in many applications. The same is true for chain stopping agents such as bisulfite and sodium metabisulfite.

High levels of metal ions together with high levels of initiator have also been tried as a means for controlling molecular weight. This method is taught in U.S. Pat. No. 4,314,044 where the ratio of initiator to metal ion is from about 10:1 to about 150:1 and the initiator is present from about 0.5 to about 35 percent based on the total weight of the monomers. Such an approach is unsuitable for some products, such as water treatment polymers, which can not tolerate metal ion contaminants in the polymer product. In addition, the product is usually discolored due to the presence of the metal ions.

One economical approach to the production of low molecular weight polymers has been by continuous processes. The continuous processes previously known are either bulk processes, or non-aqueous solvent processes. The problem with bulk processes is the loss of control of molecular weight in the absence of efficient chain transfer agents. Non-aqueous solvent processes also have the problem of increased cost due to the raw materials, solvent handling equipment and product separation.

U.S. Pat. No. 3,522,228 discloses the polymerization of vinyl monomers in liquid carbon dioxide at temperatures of from −78° to 100° C. Vinyl monomers include ethylene halide; styrene and its substituted compounds; acrylic acid, vinyl acetate and their derivatives; methacrylic acid, and their esters, vinylester; and compounds containing vinyl groups, such as vinyl ether. An example of the polymerization of acrylic acid in carbon dioxide at 20° C. for 15 hours produced a polymer having a molecular weight of 480,000.

Canadian Patent Number 1,262,995 discloses free-radial polymerization in supercritical carbon dioxide at temperatures of from about 31°–150° C. It is disclosed that homopolymers of N-vinylcarboxamide, water-soluble esters of ethylenically unsaturated carboxylic acids, N-vinyllactam, N-vinylimidazole and N-vinylimidazoline, or copolymers of N-vinylformamide with N-vinylpyrrolidone or vinyl acetate can be produced in this manner.

Canadian Patent Number 1,274,942 discloses homopolymerization of monoethylenically unsaturated $C_3$–$C_5$ carboxylic acids in supercritical carbon dioxide. It is disclosed that high temperatures may result in some degree of decomposition and crosslinking, rendering the polymer insoluble in solvents, and it is therefore preferred to control the temperature at a maximum of 140° C. and preferably a maximum of 85° C. and, in general, the pressure should not exceed 4500 psi. Example 1 of Canadian Patent Number 1,274,942 discloses the polymerization of acrylic acid conducted in supercritical carbon dioxide at 80° C. wherein an exotherm brought the temperature of the reaction mixture to 146° C. Canadian Patent 1,274,942 further noted that the exotherm temperature of Example 1 exceeded the maximum set forth above, and that the product showed signs of deterioration.

European Patent Application 0301532A discloses polymerizations in supercritical carbon dioxide to produce crosslinked acrylic polymers. These polymers are disclosed as being useful as thickening agents and are prepared in about 2 to about 24 hours at temperatures of from about 25° C. to about 125° C.

It is an object of the present invention to provide a process for the production of low molecular weight polymers.

It is a further object of the present invention to provide a process which does not require the use of organic solvent, or efficient chain transfer agents as a means of controlling the molecular weight of the resulting polymers.

Another object of this invention is to provide a process which uses a solvent which is not flammable or toxic, is relatively inexpensive and is easily removed from the polymer product.

Another object of this invention is to provide a process which results in polymers having weight average molecular weights below 5,000, preferably below 1,000.

Another object of this invention is to provide a polymer product having weight average molecular weights below 5,000 and a polydispersity below 2.5.

Other objects of this invention will be apparent to those skilled in the art in light of the present disclosure and appended claims.

SUMMARY OF THE INVENTION

The present invention provides a process for the production of low molecular weight polymers. More specifically, the present invention provides a process for preparing polymers having weight average molecular weights below 5,000 by (a) forming a reaction mixture of one or more polymerizable monomers, and a free-radical initiator in supercritical carbon dioxide at an elevated temperature of at least 200° C. and an elevated pressure of at least about 3,500 psi such that the monomer is present in the reaction mixture at level of below 20 percent by weight of the supercritical carbon dioxide; and (b) maintaining the reaction mixture at said elevated temperature to form a polymer product.

DETAILED DESCRIPTION OF THE INVENTION

A supercritical fluid exists as a form of matter in which its liquid and gaseous states are indistinguishable from one another. The critical temperature of the fluid is the temperature above which that fluid cannot be liquified by an increase in pressure. The critical pressure of a fluid is the pressure of the fluid at its critical temperature. According to J. A. Hyatt, *J. Org. Chem.* 49 (1984), 5097–5101, carbon dioxide is a supercritical fluid when its temperature exceeds 31° C. and the pressure exceeds 73 atmospheres (approximately 1070 pounds per square inch).

The process of the present invention is conducted in supercritical carbon dioxide at temperatures above 200° C. The polymer products of polymerizations conducted in supercritical carbon dioxide at temperatures below 200° C. have increased molecular weight and polydispersity. The upper limit of temperature for the process of the present invention is dependent upon the capability of the reactor and the ceiling temperature of the polymer formed. In general, it is preferred to conduct the polymerizations at a temperature of from about 250° C. to about 450° C.

The process of the present invention is conducted in supercritical carbon dioxide at pressures above about 3,500. In general, it is preferred to conduct the polymerization at from about 4,000 to about 10,000 psi, and more preferably at from about 4,200 to about 7,000 psi.

One class of monomers suitable for the present invention are $C_3$–$C_6$ monoethylenically unsaturated monocarboxylic acids. The $C_3$–$C_6$ monoethylenically unsaturated monocarboxylic acids include acrylic acid (AA), methacrylic acid, crotonic acid, vinylacetic acid, maleamic acid, fomaramic acid and acryloxypropionic acid. Acrylic acid and methacrylic acid are preferred monoethylenically unsaturated monocarboxylic acid monomers.

Another class of monomers suitable for the present invention are $C_4$–$C_6$ monoethylenically unsaturated dicarboxylic acids and the anhydrides of the cisdicarboxylic acids. Suitable examples include maleic acid, maleic anhydride, itaconic acid, mesaconic acid, fumaric acid and citraconic acid. Maleic anhydride and itaconic acid are preferred monoethylenically unsaturated dicarboxylic acid monomers.

Other polymerizable monomers suitable for the present invention are monoethylenically unsaturated carboxyl-free monomers such as alkyl esters of acrylic or methacrylic acids including methyl acrylate, ethyl acrylate, butyl acrylate, methyl methacrylate, ethyl methacrylate, butyl methacrylate and isobutyl methacrylate; hydroxyalkyl esters of acrylic or methacrylic acids including hydroxyethyl acrylate, hydroxypropyl acrylate, hydroxyethyl methacrylate, and hydroxypropyl methacrylate; acrylamide, methacrylamide, N-tertiarybutylacrylamide, N-methylacrylamide, N,N-dimethylacrylamide; acrylonitrile, methacrylonitrile, allyl alcohol, allylsulfonic acid, allylphosphonic acid, vinylphosphonic acid, dimethylaminoethyl acrylate, dimethylaminoethyl methacrylate, phosphoethyl methacrylate, N-vinylpyrrolidone, N-vinylformamide, N-vinylimidazole, vinyl acetate, styrene, styrenesulfonic acid, vinylsulfonic acid, and 2-acrylamido-2-methylpropanesulfonic acid.

The monomers may be used in their pure form, or they may be diluted with a solvent such as water or inert organic solvents. Preferably, monomers are used in their pure form. It is also preferred that acid monomers be used in their acid form rather than in the form of the alkali metal or ammonium salts of the acid because the salts are less soluble in carbon dioxide. The polymer products, however, are often particularly useful in their partially or completely neutralized form. Suitable bases useful for neutralizing the polymer products include sodium hydroxide, ammonium hydroxide, and potassium hydroxide.

The combination of the one or more polymerizable monomers and the supercritical carbon dioxide is referred to as the polymerization mixture. The one or more polymerizable monomers are present in the reaction mixture at level of below 20 percent by weight of the supercritical carbon dioxide, preferably below 15 percent by weight of the supercritical carbon dioxide.

The following discussion is offered as a theory as to why the level of the one or more polymerizable monomers should be limited in the reaction mixture. The process of the present invention is not intended to be limited by the theory. It is believed that the level of the one or more polymerizable monomers in the polymerization mixture should not exceed the level at which the one or more polymerizable monomers will form a single phase with the supercritical carbon dioxide at the temperature and pressure of the reaction. In other words, the level of the one or more polymerizable monomers should not exceed the level at which they are soluble in the supercritical carbon dioxide. An excess of the one or more polymerizable monomers beyond the solubility limits in the supercritical carbon dioxide may result in high molecular weight polymer gel formation and an increase in the polydispersity (D) of the resulting polymer product. The solubility of monomers in supercritical carbon dioxide will be affected by the reaction conditions. The solubility of monomers in supercritical carbon dioxide increases as pressure increases and decreases as temperature increases. For example, the solubility of acrylic acid in supercritical carbon dioxide at 250° C. and 4,000 psi is less than 20 percent by weight.

Suitable initiators for the process of the present invention are those free-radical initiators which have a half-life of at least 0.1 seconds, preferably at least 0.2 seconds, at the polymerization temperature. These high-temperature initiators include, but are not limited to, hydrogen peroxide, certain alkyl hydroperoxides, dialkyl peroxides, peresters, percarbonates, and ketone peroxides. Specific examples of some suitable initiators include hydrogen peroxide, oxygen, t-butyl hydroperoxide, di-tertiary butyl peroxide, p-menthane hydroperoxide, pinane hydroperoxide, cumene hydroperoxide, tertiary-amyl hydroperoxide and methylethyl ketone peroxide. The preferred initiator is t-butyl hydroperoxide (t-BHP). The initiators are normally used in amounts of from about 0.05 percent to about 20 percent based on the weight of total polymerizable monomer. A preferred range is from about 0.5 to about 15 percent by weight of the total polymerizable monomer. It is preferred that the initiators are liquids or gases so that they are more easily pumped into the reaction mixture. If necessary, initiators may be dissolved in a suitable solvent, such as water, an inert organic solvent or combinations thereof.

The processes of the present invention can be run as batch, semi-continuous or continuous processes. A batch process is one where the initiator is added as quickly as possible to the reactor containing the supercritical carbon dioxide at the reaction temperature. The one or more monomers may be added at the same time as the initiator or may be present in the reactor at the time of addition of the initiator or a combination thereof. The one or more monomers and initiator may be combined prior to addition to the reactor, or they may be added to the reactor as separate addition streams.

A semi-continuous process is one where the initiator is metered into the reactor containing the supercritical carbon dioxide at the reaction temperature over a period of time. The one or more monomers may be metered into the reactor along with the initiator, or may be present in the reactor at the time of addition of the initiator or a combination thereof. The period of time over which the initiator and one or more monomers can be metered into the reactor is from about 1 minute to about 10 hours, preferably from about 10 minutes to about 5 hours. In a semi-continuous process, it is preferred that the initiator and one or more monomers be metered into the reactor as separate streams and at constant rates throughout the addition, i.e. linearly. A semi-continuous process allows for greater productivity from the reactor. Although the instantaneous monomer concentration should not exceed the solubility limit of the monomer in the supercritical carbon dioxide, the total amount of monomer introduced into the reactor over time may be greater than that which can be added in a batch process.

A continuous process is one where the initiator, one or more monomers and supercritical carbon dioxide are continuously metered into the reactor containing the supercritical carbon dioxide at the reaction temperature while simultaneously removing polymer product from the reactor. A continuous process also allows for greater productivity from the reactor compared to a batch or semi-continuous process.

After the polymerization mixture is formed, the elevated temperature must be maintained for a sufficient period of time to form polymer product. In a batch or semi-continuous process, this is referred to as the "hold time" and in a continuous process this is referred to as the "residence time." The hold time or residence time is at least as long as one half-life of the initiator. Preferably, the hold time or residence time is from about 2 to about 100 half-lives of the initiator.

The process of the present invention generally results in less than 100 percent conversion of the monomers (based on the total weight of polymerizable monomer) into polymer product. However, no detectable residual monomer is present in the polymer product. Following the polymerization in a batch or semi-continuous process, the reactor is vented to atmospheric pressure, or flushed with an inert liquid, gas or supercritical fluid, to reduce the temperature and pressure of the reactor. Venting or flushing the reactor in this manner also effectuates a purification of the polymer product. The effluent from the reactor contains all the unreacted monomer because the unreacted monomer is soluble in the supercritical carbon dioxide. After the effluent mixture of carbon dioxide and unreacted monomer are vented or flushed from the reactor, the effluent mixture can be further cooled and separated, and one or more of the components can be recycled. In a continuous process, the venting or flushing of the polymer product takes place in one or more downstream reactors or containment vessels. Preferably, supercritical carbon dioxide at a temperature and pressure below that of the polymerization temperature and pressure is used to flush the reactor after the polymerization.

The process produces polymer products having high purity, low molecular weight, and narrow polydispersity. The process of the present invention is effective in producing low molecular weight polymers without resorting to other techniques previously known; for example, the use of chain transfer agents, metal ions or chain stopping agents. If desired, however, those techniques can be incorporated into the process of the present invention.

The process of the present invention results in polymers having low molecular weights and narrow polydispersities. Furthermore, the process results in products which do not require the removal of water or organic solvents. The process of the present invention can be used to produce polymers having weight average molecular weights below 5,000. In one embodiment of the present invention, polymer products are produced having weight average molecular weights below 1,000. The polydispersities of the polymer products are below about 2.5, and preferably below about 2.0.

EXPERIMENTAL PROCEDURE

A 300 milliliter autoclave equipped with a mechanical stirrer, temperature probe, heating jacket and inlet ports for monomer, carbon dioxide, and initiator, was sealed and purged three times with carbon dioxide at a pressure of below 2 atmospheres. With the stirrer on, the autoclave was then heated to within 10 degrees Celsius of the polymerization temperature. Additional carbon dioxide was pumped into the autoclave to adjust the internal pressure to within 500 psi of the desired polymerization pressure. The monomer was then pumped into the autoclave. The temperature and pressure were adjusted to the desired polymerization conditions. The initiator was then flushed into the autoclave with carbon dioxide as a carrier. The contents of the autoclave were maintained at the polymerization temperature and pressure for a predetermined amount of time. After the polymerization was complete, the autoclave was flushed with carbon dioxide at a pressure of about 500 psi below the polymerization pressure at a rate of approximately 5 liters/minute (as measured at standard temperature and pressure) for 1 to 2 hours while venting the autoclave to a pressure let-down valve where unreacted monomer was separated from the carbon dioxide. The carbon dioxide was vented to atmospheric pressure.

Tables I, II and III, below, show data for several experiments run in the manner described above. The molecular weights reported in Tables I and II were measured by aqueous gel permeation chromatography using a Progel TM TSK GMPWXL GEL column, (purchased from Supelco, Inc., Bellefonte, Pa.) with dimensions of 30 centimeters by 7.8 millimeters, against a poly(acrylic acid) standard having a weight average molecular weight of 4,500 (Progel is a trademark of TosoH Corp.). The molecular weights reported in Table III were measured by aqueous gel permeation chromatography using a Progel TM TSK G3000 PWXL GEL column, (purchased from Supelco, Inc., Bellefonte, Pa.) with dimensions of 30 centimeters by 7.8 millimeters, against a poly(acrylic acid) standard having a weight average molecular weight of 1,000. The hold times for the experiments in Table I were 6 hours unless otherwise indicated. The hold times for the experiments in Tables II and III were 10 minutes or less. The initiator (Init.) used in all the experiments was commercial grade t-BHP (t-BHP, 90 percent by weight/water, 5 percent by weight/t-butyl alcohol, 5 percent by weight) unless otherwise indicated.

TABLE I

| Example | AA (g) | Init. (g) | Temp. (°C.) | Pressure (psi) | $M_w$ | $M_n$ | D |
|---|---|---|---|---|---|---|---|
| 1 | 15.1 | 0.31[1] | 85 | 3,610 | 380,000 | 49,480 | 7.68 |
| 2 | 10.0 | 0.20 | 140 | 3,368 | 36,300 | 6,029 | 6.02 |
| 3 | 10.0 | 0.20 | 160 | 3,700 | 44,900 | 5,850 | 7.68 |
| 4 | 10.0 | 0.20 | 180 | 3,700 | 34,000 | 5,440 | 6.25 |
| 5 | 10.0 | 0.20 | 160 | 2,700 | 79,800 | 7,760 | 10.24 |
| 6 | 10.0 | 0.20 | 180 | 2,700 | 67,200 | 6,380 | 10.54 |
| 7 | 10.0 | 0.20 | 220 | 4,500 | 2,980 | 2,400 | 1.22 |
| 8 | 10.0 | 0.20 | 250 | 4,500 | 1,830 | 1,430 | 1.29 |
| 9 | 10.0 | 0.73 | 220 | 4,500 | 3,910 | 2,510 | 1.56 |
| 10 | 10.0 | 0.53[2] | 230 | 4,500 | 3,100 | 2,270 | 1.37 |
| 11 | 10.0 | 0.00 | 250 | 4,500 | no polymer formation observed | | |
| 12 | 10.0 | 0.20 | 250 | 4,500 | 2,630 | 2,110 | 1.25 |
| 13 | 10.0 | 0.40 | 250 | 4,500 | 2,310 | 1,910 | 1.21 |
| 14 | 10.0 | 0.20 | 250 | 4,500 | 2,630 | 2,130 | 1.24 |
| 15 | 10.0 | 0.10 | 250 | 4,500 | 2,340 | 1,930 | 1.21 |
| 16 | 10.0 | 0.40[3] | 250 | 4,500 | 2,740 | 2,190 | 1.25 |
| 17 | 10.0 | 0.40[4] | 250 | 4,500 | 2,610 | 2,280 | 1.15 |
| 18 | 10.0 | 0.60 | 250 | 4,500 | 2,420 | 2,180 | 1.11 |
| 19 | 10.0 | 0.50[5] | 250 | 4,500 | 6,010 | 3,090 | 1.95 |
| 20 | 5.0 | 0.30 | 250 | 3,500 | 1,510 | 1,020 | 1.48 |
| 21 | 5.0 | 0.30 | 250 | 4,500 | 1,540 | 1,210 | 1.27 |
| 22[6] | 30.0 | 1.75 | 250 | 3,500 | 3,110 | 2,600 | 1.20 |
| 23[6] | 30.0 | 1.75 | 250 | 3,500 | 3,730 | 3,090 | 1.21 |
| 24[7] | 30.0 | 1.75 | 140 | 3,500 | 46,500 | 8,260 | 5.63 |

[1]Azo-bisisobutyronitrile was used as the initiator.
[2]0.3 grams of isopropyl alcohol was also added along with the initiator.
[3]0.2 grams of t-BHP was added initially. 0.2 grams of t-BHP was added after two hours.
[4]Hold time was 2 hours.
[5]A 30 percent by weight aqueous solution of hydrogen peroxide was used as the initiator.
[6]The monomer and initiator were metered into the autoclave linearly but separately over a period of two hours. A 1,000 milliliter autoclave was used. Hold time was three hours.
[7]The monomer and initiator were metered into the autoclave linearly but separately over a period of two hours. A 300 milliliter autoclave was used. Hold time was two hours.

TABLE II

| Example | AA (g) | Init. (g) | Temp. (°C.) | Pressure (psi) | $M_w$ | $M_n$ | D |
|---|---|---|---|---|---|---|---|
| 25 | 7.0 | 0.30 | 270 | 4,500 | 2,140 | 1,980 | 1.08 |
| 26 | 10.0 | 0.30 | 270 | 4,500 | 2,190 | 2,020 | 1.08 |
| 27 | 10.0 | 0.30 | 270 | 4,500 | 2,360 | 2,140 | 1.10 |
| 28 | 12.0 | 0.30 | 270 | 4,500 | 2,340 | 2,120 | 1.10 |
| 29 | 12.0 | 0.60 | 250 | 4,500 | 2,650 | 2,310 | 1.15 |
| 30 | 12.0 | 0.30 | 270 | 4,500 | 2,060 | 1,890 | 1.09 |
| 31 | 12.0 | 0.30 | 270 | 4,500 | 2,190 | 1,990 | 1.10 |
| 32[8] | 20.0 | 1.19 | 300 | 4,700 | 1,340 | 1,030 | 1.29 |
| 33 | 10.0 | 0.37 | 310 | 4,700 | 1,450 | 1,200 | 1.21 |

TABLE II-continued

| Example | AA (g) | Init. (g) | Temp. (°C.) | Pressure (psi) | $M_w$ | $M_n$ | D |
|---|---|---|---|---|---|---|---|
| 34 | 10.0 | 0.75 | 340 | 4,700 | 622 | 406 | 1.53 |

[a] A 1,000 milliliter autoclave was used.

TABLE III

| Example | AA (g) | Init. (g) | Temp. (°C.) | Pressure (psi) | $M_w$ | $M_n$ | D |
|---|---|---|---|---|---|---|---|
| 35[a] | 20.0 | 1.22 | 300 | 4,700 | 885 | 511 | 1.73 |
| 36[a] | 20.0 | 1.19 | 300 | 4,700 | 882 | 558 | 1.58 |
| 37 | 10.0 | 0.37 | 310 | 4,700 | 868 | 493 | 1.76 |
| 38 | 10.0 | 0.74 | 320 | 4,700 | 606 | 435 | 1.39 |
| 39 | 10.0 | 0.74 | 330 | 4,700 | 553 | 388 | 1.43 |
| 40 | 10.0 | 0.73 | 340 | 4,700 | 508 | 354 | 1.43 |
| 41 | 10.0 | 0.75 | 340 | 4,700 | 520 | 320 | 1.63 |
| 42 | 7.0 | 0.34 | 350 | 4,700 | 563 | 403 | 1.40 |

[a] A 1,000 milliliter autoclave was used.

The data in Tables I, II, and III show that the polymerizations conducted at temperatures above 200° C. and pressures above 3,500 psi produced polymers with weight average molecular weights below 5,000. No residual monomer was detected in the polymerizations conducted at temperatures above 200° C. and pressures above 3,500 psi produced polymers with weight average molecular weights below 5,000. Example 11 shows that no polymer was formed in the absence of initiator. The polymerizations conducted at temperatures below 200° C. and pressures at or below 3,500 psi produced polymers with weight average molecular weights above 5,000.

We claim:

1. A process for preparing polymers having weight average molecular weights below 5,000 comprising:
   (a) forming a reaction mixture of one or more polymerizable monomers, and a free-radical initiator in supercritical carbon dioxide at an elevated temperature of at least 200° C. and an elevated pressure of at least about 3,500 psi such that the one or more monomers are present in the reaction mixture at level of below 20 percent by weight of the supercritical carbon dioxide; and
   (b) maintaining the reaction mixture at said elevated temperature to form a polymer product.

2. The process of claim 1 wherein the elevated temperature is from about 250° C. to about 450° C.

3. The process of claim 1 wherein the elevated temperature is from about 300° C. to about 400° C.

4. The process of claim 1 wherein the elevated pressure is from about 4,000 psi to about 10,000 psi.

5. The process of claim 1 wherein the elevated pressure is from about 4,200 psi to about 7,000 psi.

6. The process of claim 1 wherein the one or more monomers are present in the reaction mixture at level of below 15 percent by weight of the supercritical carbon dioxide.

7. The process of claim 1 wherein the elevated temperature is from about 250° C. to about 450° C., the elevated pressure is from about 4,000 psi to about 10,000 psi and the one or more monomers are present in the reaction mixture at level of below 15 percent by weight of the supercritical carbon dioxide.

8. The process of claim 1 wherein the elevated temperature is from about 300° C. to about 400° C., the elevated pressure is from about 4,200 psi to about 7,000 psi and the one or more monomers are present in the reaction mixture at level of below 15 percent by weight of the supercritical carbon dioxide.

9. The process of claims 1, 7 or 8 wherein the polymer product has $M_w$ below 1,000.

10. The process of claims 1, 7 or 8 wherein the process is a batch process.

11. The process of claims 1, 7 or 8 wherein the process is a semi-continuous process.

12. The process of claims 1, 7 or 8 wherein the process is a continuous process.

13. The process of claims 1, 7 or 8 wherein the one or more polymerizable monomers are selected from the group consisting of acrylic acid, methacrylic acid, maleic acid, maleic anhydride, itaconic acid, crotonic acid, and fumaric acid.

14. The process of claims 1, 7 or 8 wherein the one or more polymerizable monomers are selected from the group consisting of acrylic acid, maleic acid and maleic anhydride.

15. The process of claims 1, 7 or 8 wherein the one or more polymerizable monomers is acrylic acid.

16. The process of claims 1, 7 or 8 wherein the initiator is selected from the group consisting of hydrogen peroxide, oxygen, t-butyl hydroperoxide, di-tertiary butyl peroxide, tertiary-amyl hydroperoxide and methylethyl ketone peroxide.

17. The process of claims 1, 7 or 8 wherein the initiator is selected from the group consisting of oxygen and t-butyl hydroperoxide.

* * * * *